United States Patent [19]

Chennakeshu et al.

[11] Patent Number: 5,285,480
[45] Date of Patent: Feb. 8, 1994

[54] ADAPTIVE MLSE-VA RECEIVER FOR DIGITAL CELLULAR RADIO

[75] Inventors: Sandeep Chennakeshu, Clifton Park; Anand Narasimhan, New York; John B. Anderson, Latham, all of N.Y.

[73] Assignee: General Electric Company, Schenectady, N.Y.

[21] Appl. No.: 753,578

[22] Filed: Sep. 3, 1991

[51] Int. Cl.$^5$ .................. H03K 5/159; H03D 1/06
[52] U.S. Cl. ........................ 375/101; 375/94; 375/96; 379/59; 370/95.3; 364/724.16
[58] Field of Search .................. 375/14, 39, 94, 96, 375/101, 103; 371/43; 370/95.3; 379/59; 364/724.02, 724.11, 724.12, 724.16

[56] References Cited

U.S. PATENT DOCUMENTS

| | | | |
|---|---|---|---|
| 4,328,585 | 5/1982 | Monsen | 375/14 |
| 4,731,800 | 3/1988 | Motley et al. | 375/101 |
| 4,843,615 | 6/1989 | Davis | 375/98 |
| 4,852,090 | 7/1989 | Borth | 375/101 |
| 5,142,551 | 8/1992 | Borth et al. | 375/103 |

OTHER PUBLICATIONS

"New Adaptive Viterbi Detector For Fast-Fading Mobile-Radio Channels", Electronics Letters, Sep. 13, 1990, vol. 26, No. 19, pp. 1572-1573.
"Bit Synchronization and Timing Sensitivity in Adaptive Viterbi Equalizers for Narrowband TDMA Digital Mobile Radio Systems", IEEE Vehicular Technology Conference, Philadelphia, pp. 377-384, 1988.
Journal on Selected Areas in Communications, D'Avella et al., vol. 7, No. 1, Jan. 1989, pp. 122-129.
"Design and Performance of Synchronization Techniques and Viterbi ADaptive Equalizers for Narrowband TDMA Mobile Radio", D'Area et al., Proc. 3rd Nordic Seminar on Digital Land Mobile Comm., Copenhagen, Denmark, Sep. 13-15, 1988.
"Application of Fast Kalman Estimation to Adaptive Equalization", Falconer et al., IEEE Transactions on Communications, vol. COM-26, No. 10, Oct. 1978, pp. 1439-1446.
"Adaptive Maximum-Likelihood Receiver for Carrier-Modulated Data-Transmission Systems", G. Underboeck, IEEE Transactions on Communications, May 1974, pp. 624-636.

Primary Examiner—Curtis Kuntz
Assistant Examiner—Young Tse
Attorney, Agent, or Firm—Marvin Snyder

[57] ABSTRACT

A TDMA RF received signal is demodulated by first being filtered with a fixed transversal filter having a characteristic selected for matching a fixed square root raised cosine pulse characteristic of the received signal. The filtered signal is then adaptively filtered for compensating for a time varying impulse response of the channel. The adaptive filtering is performed initially during a synchronizing portion (preamble) of the filtered signal in accordance with a fast recursive least squares algorithm. Subsequent filter adaptation to a data portion of the filtered signal is accomplished in accordance with a computationally less expensive normalized least mean square procedure. The adaptive filter repetitively applies a modified Viterbi algorithm to blocks of 2D symbols, such that D symbols are released for adapting the adaptive filter means during the data portion of the filtered signal and the signal. The released symbols are also employed for adapting elements required in computing a metric for the modified Viterbi algorithm and the reconstructed signal used to form an error signal that drives the adaptation algorithms.

15 Claims, 6 Drawing Sheets

ADAPTIVE MLSE-VA RECEIVER FOR DIGITAL CELLULAR RADIO

RELATED APPLICATIONS

This application is related to the following U.S. patent applications which are filed concurrently herewith and assigned to the present assignee:

H. Lester et al. Ser. No. 07/754,471, "Automatic Simulcast Alignment";

S. Chennakeshu et al. Ser. No. 07/754,105, "Decision Feedback Equalization for Digital Cellular Radio";

S. Chennakeshu et al. Ser. No. 07/753,579, "Order Recursive Lattice Decision Feedback Equalization for Digital Cellular Radio"; and R. Toy et al. Ser. No. 07/754,108, "Frame/Slot Synchronization for U.S. Digital Cellular TDMA Radio Telephone System".

FIELD OF THE INVENTION

This invention relates generally to telecommunication method and apparatus and, in particular, to a demodulator for a digital cellular radio receiver that operates in accordance with a maximum likelihood sequence estimator employing a modified Viterbi algorithm (MLSE-VA).

BACKGROUND OF THE INVENTION

A requirement for increased capacity in the U.S. cellular radio system has resulted in adoption of digital technology. The digital system employs time division multiple access (TDMA) as a channel access method in conjunction with a digital modulation scheme. A proposed standard (IS-54) for digital cellular communication specifies a particular frame and slot structure. Under this standard, three to six users share a common 30 KHz radio frequency (RF) channel. Each user transmits data in an assigned time slot which is part of a larger frame. The gross bit rate of data transmitted over the channel is 48.6 Kbits/sec. The transmitted digital data is first mapped onto pi/4-shifted differentially encoded quadrature phase shift keying (DQPSK) symbols and then pulse shaped using a square root raised cosine filter. The pulse shaped signal is subsequently modulated onto an RF carrier.

Data transmission in this digital cellular system is adversely affected by multipath propagation which causes delay spread and consequent inter-symbol interference (ISI), where a symbol is comprised of a pair of binary bits. Delay spread is expressed in terms of a quantity called delay interval, which is measured as the time interval between the first ray and last significant ray arriving at the receiver. Delay spreads exceeding one third of the symbol duration cause a significant increase in bit error rate (BER), necessitating use of an equalizer in the receiver. Typical delay spreads encountered in urban and rural areas in the U.S. are less than 40 microseconds, implying a need for equalization of one symbol of interference (40 microseconds) for a data rate of 48.6 Kbits/sec. Mobile receivers also experience rapid channel variations and Doppler induced frequency shifts that are proportional to vehicle speed.

The channel impairments described above require that nonlinear adaptive equalizers be incorporated in cellular radios. Two suitable equalizers are the decision feedback equalizer (DFE) and an equalizer based on a maximum likelihood sequence estimator (MLSE). The MLSE method employs the well known Viterbi algorithm and is referred to in the art as a Viterbi equalizer or an MLSE-VA equalizer.

Both the MLSE and DFE techniques have been researched in some detail for the European CEPT/GSM cellular radio system. Results of this research are reported by, for example, R. D'Avella et al. "An Adaptive MLSE Receiver for TDMA Digital Mobile Radio", IEEE Journal on Selected Areas in Communications, Vol. 7, No. 1, pp. 122-129, Jan. 1989, G. D'Aria et al. "Design and Performance of Synchronization Techniques and Viterbi Adaptive Equalizers for Narrowband TDMA Mobile Radio", proceedings of 3rd Nordic Seminar on Digital Land Mobile Radio Comm., Copenhagen, Denmark, Sep. 13-15, 1988 and A. Baier et al., "Bit Synchronization and Timing Sensitivity in Adaptive Viterbi Equalizers for Narrowband TDMA Digital Mobile Radio Systems", proceedings of IEEE Vehicular Technology Conference, Philadelphia, pp. 377-384, 1988.

The CEPT/GSM system, however, is quite different from the system proposed for the U.S. in that it employs a narrower time slot, partial response modulation Gaussian Minimum Shift Keying (GMSK), a wider bandwidth (200 KHz) and a higher data rate (270.8 Kbits/sec.). The narrower time slot typically permits the channel to be treated as being time invariant while the wider bandwidth implies a reduced fade depth. The higher data rate results in increased ISI. As a result, the channel equalization requirements of the European and the proposed U.S. cellular systems are different.

A fractionally spaced DFE (FS-DFE) technique is disclosed by the present inventors S. Chennakeshu, A. Narasimhan and J. B. Anderson in copending and commonly assigned U.S. patent application Ser. No. 07/754.105, filed Sep. 3, 1991, entitled "Decision Feedback Equalization for Digital Cellular Radio". This DFE technique employs a complex fast Kalman algorithm to track channel variations. The fast Kalman algorithm described therein is an extension of a type taught by D. Falconer et al. in "Application of Fast Kalman Estimation to Adaptive Equalization", IEEE Trans. Comm., Vol. COM-26, No. 10, pp. 1439-1446, Oct. 1978. The extensions provide for the use of a complex form without matrix inversions and stabilization of the algorithm, for finite precision implementation, through the addition of appropriate dither signals.

An alternative technique employs an equalizer based on a lattice structure and is disclosed by the present inventors S. Chennakeshu, A. Narasimhan and J. B. Anderson in copending and commonly assigned U.S. patent application Ser. No. 07/753,579, filed Sep. 3, 1991, entitled "Order Recursive Lattice Decision Feedback Equalization For Digital Cellular Radio". This DFE method employs a least squares (LS) adaptive algorithm to achieve convergence and tracking properties similar to that of the complex fast Kalman algorithm.

Another technique achieves equalization through MLSE demodulation. There are two fundamental approaches to realizing a MLSE demodulator. One of these approaches is described by G. D. Forney in "Maximum-Likelihood Sequence Estimation of Digital Sequences in the Presence of Intersymbol Interference", IEEE Trans. Info. Theory, Vol. IT18, pp. 363-378, May 1972. Forney's approach uses a Viterbi algorithm to realize the maximum likelihood sequence estimator, with a squared metric that is derived based on the assumption that the additive noise in the received signal, at the input of the maximum likelihood sequence estimator, is white and Guassian. This is accomplished through use of a whitening filter at the input of the maximum likelihood sequence estimator.

The other MLSE approach is described by Gottfried Ungerboeck in "Adaptive Maximum Likelihood Receiver for Carrier Modulated Data Transmission Systems", IEEE Trans. Comm., Vol. COM22, No. 5, pp. 624–636, May 1974. This MLSE approach employs a matched filter followed by a MLSE algorithm and an auxiliary channel estimation scheme.

The technique of Ungerboeck is currently favored, primarily to circumvent stability problems associated with use of the whitening filter. The Ungerboeck MLSE demodulator includes a transversal filter to approximate a matched filter, use of the Viterbi algorithm to implement the MLSE and a set of LMS or gradient algorithms to perform adaptation functions for the channel estimation. Differences in design of the matched filter and channel estimation algorithm account for range complexity and performance differences in various implementations of this demodulator. The equalization approach used in the CEPT/GSM system (as described by R. D'Avella et al. in "An Adaptive MLSE Receiver for TDMA Digital Mobile Radio", IEEE Journal on Selected Areas in Communications, Vol. 7, No. 1, pp. 122–129, January 1989) is similar to Ungerboeck's approach, except that the initial estimate of the channel impulse response is acquired through a correlation based search.

As was previously stated, however, the significant differences between the CEPT/GSM and the proposed U.S. digital cellular systems preclude the adaptation, without significant and non-trivial modification, of the CEPT/GSM equalization technique in the U.S.

It is thus an object of the invention to provide an adaptive MLSE-VA receiver for a digital cellular radio system that is suitable for use with the proposed U.S. cellular signalling standard.

SUMMARY OF THE INVENTION

The foregoing problems are overcome and the objects of the invention are realized by utilizing an adaptive maximum likelihood sequence estimator employing a modified Viterbi algorithm as a demodulator for a digital cellular radio system.

The apparatus and method of the invention improves upon the teaching of Ungerboeck as embodied in the CEPT/GSM system by partitioning the matched filter into two sections. The first section is comprised of a fixed transversal filter and the second section is comprised of an adaptive transversal filter. The adaptive transversal filter is relatively short, thereby reducing computational load on the adaptation algorithm. According to the invention, the channel impulse response (CIR) is initially acquired using a complex fast Kalman algorithm, but subsequent tracking is accomplished with a normalized least mean square algorithm (NLMS). The NLMS algorithm has been found to have an optimal step size, based on a least squares criterion and, as a result, has a smaller misadjustment error than the LMS algorithm. The invention also teaches, in place of the use of autocorrelation of the estimated channel impulse response (CIR) to compute the signal elements for the Viterbi algorithm, directly computing these signal elements through a modified NLMS algorithm derived from a recognition and exploitation of the symmetry property of the signal elements. Furthermore, the technique of the invention recognizes and exploits the observation that an optimal decision depth used in the Viterbi algorithm is a function of the channel fade rate, TDMA slot duration and the tracking ability of the adaptation algorithms.

Thus the invention concerns a method and apparatus for demodulating a TDMA RF signal. According to the invention, a received TDMA signal is down-converted to baseband and the down-converted signal is filtered in a first portion of filter means which constitutes a fixed transversal filter having a characteristic selected for matching a fixed square root raised cosine (SQRC) pulse characteristic of the signal transmitter, or is suitably designed to approximate this characteristic. The filtered signal is adaptively filtered in a second portion of the filter means, thereby compensating for a time varying impulse response of the signal channel. The adaptive filter is initially adapted using a synchronizing portion, or preamble, of the filtered signal in accordance with a fast recursive least squares (FRLS) algorithm, preferably a complex fast Kalman algorithm. Subsequent filter adaptation, during the data portion of the filtered signal, is accomplished in accordance with a computationally less expensive normalized least mean square (NLMS) algorithm. The maximum likelihood sequence estimator repetitively applies a modified Viterbi algorithm to blocks of 2L symbols (where L is the number of symbols chosen by the designer) such that the first L symbols are released for adapting the adaptive filter during the data portion of the filtered signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF THE INVENTION

Figure 1:
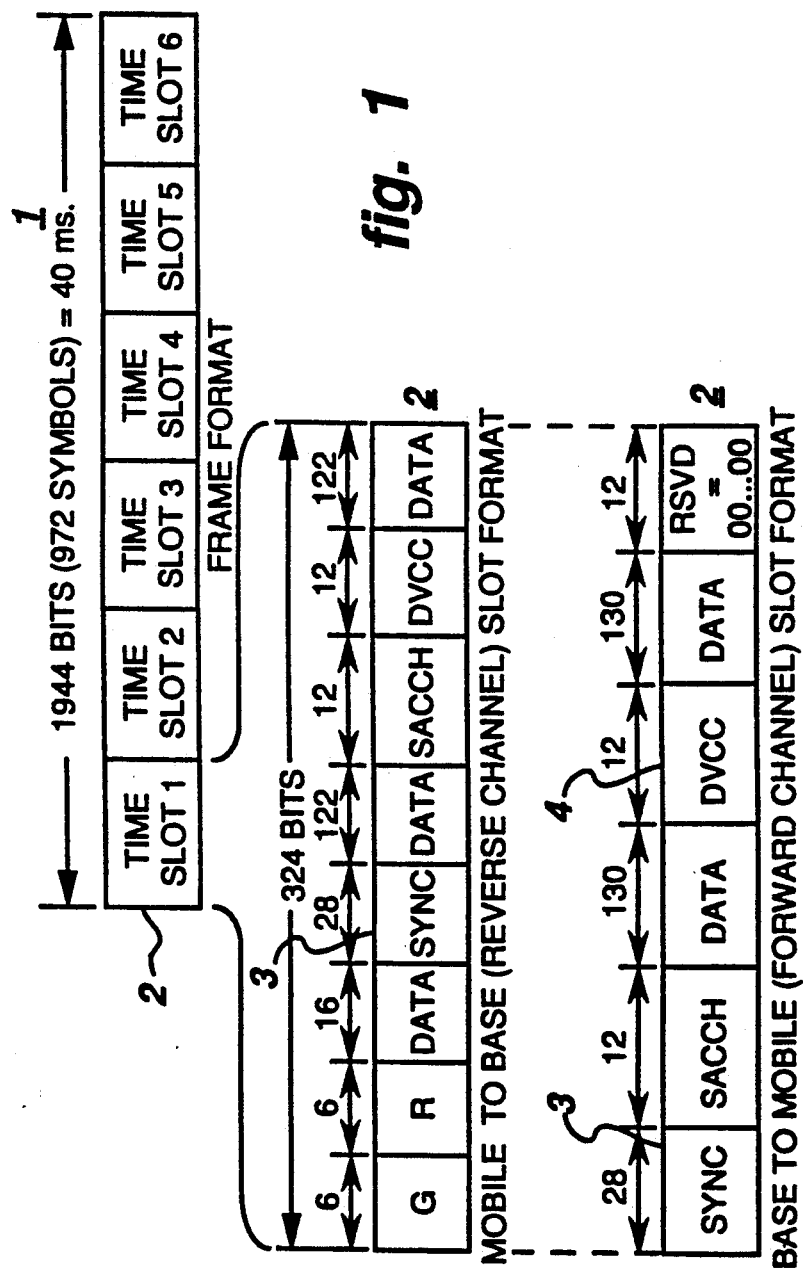
FIG. 1 illustrates the proposed IS-54 TDMA frame and slot structure.

The proposed standard (IS-54) for digital cellular communication specifies a particular frame and slot structure as illustrated in FIG. 1. Under this standard, three to six users share a common 30 KHz RF channel. Each user transmits or receives data in an assigned time slot 2 of 324 bits duration within a larger (six slot) frame 1 of 40 milliseconds duration. The gross bit rate of data transmitted over the channel is 48.6 Kbits/sec.

Figure 2:
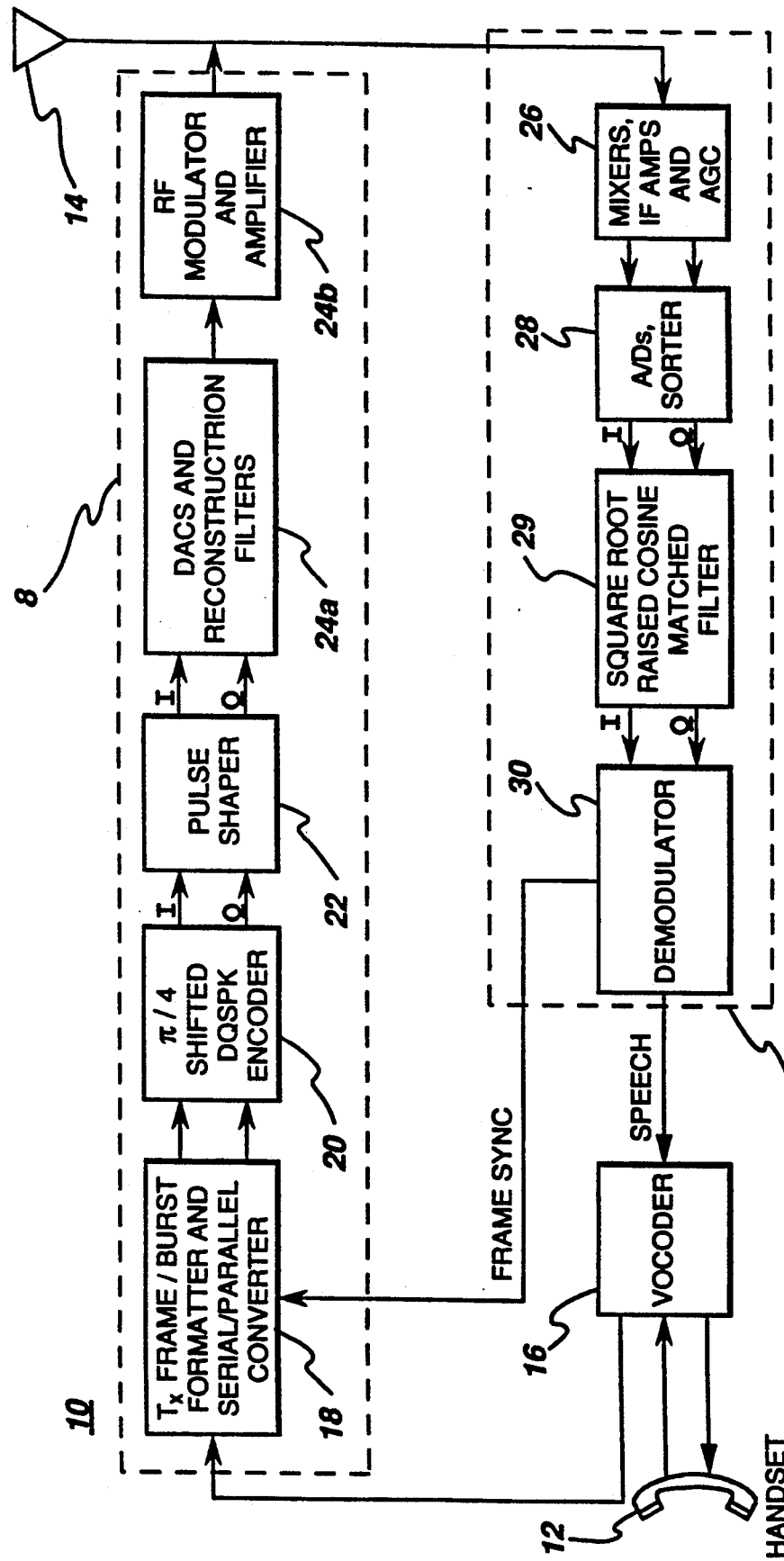
FIG. 2 is a simplified block diagram of a digital cellular radio telephone system that is constructed and operated in accordance with the invention.

FIG. 2 is a block diagram of a digital cellular radio system 10 incorporating the invention. System 10 includes a transmitter section and a receiver section. A handset 12 inputs and outputs audio information and an antenna 14 transmits an 824-849 MHz modulated RF carrier signal and receives an 869-894 MHz modulated RF signal. Each signal is transmitted in a channel having a bandwidth equal to 30 KHz. The system 10 may be installed within a motor vehicle and function as a mobile telephone. Alternatively, system 10 may be constructed for use as a hand held or portable radio unit that can be carried by a user (e.g., back-pack). A base station system may also be constructed of apparatus substantially as shown.

A vocoder 16 coupled to handset 12 includes an analog-to-digital (A/D) converter (not shown) for converting audio signals from the handset 12 microphone to a digital bit serial pulse stream. Output bit from vocoder 16 are supplied to a transmitter (Tx) frame/burst formatter 18 wherein digital data are formatted and converted to parallel form for application to a pi/4-Shifted-DQPSK encoder 20. In-phase (I) and quadrature (Q) component output signals of encoder 20 are applied to a Nyquist square root raised cosine pulse shaper 22. Formatter 8, encoder 20 and pulse shaper 22 function as a digital modulator. The pulse shaped I and Q output signals of shaper 22 are applied to analog signal reconstruction circuitry 24a that includes digital-to-analog (D/A) converters and reconstruction filters for converting the shaped I and Q input digital information to analog signals for modulating the RF carrier. The modulated RF carrier, produced by an RF modulator and amplifier 24b, is amplified and then transmitted from an antenna 14.

Vocoder 16 receives a digital pulse stream input from the receiver circuitry and includes a D/A converter (not shown) for converting this pulse stream to an analog speech signal for driving a handset 12 speaker. The receiver circuitry includes an RF and intermediate frequency (IF) stage 26 employing frequency mixers, IF amplifiers and an automatic gain control (AGC) circuit. A high speed A/D converter circuit 28 includes, preferably, a flash A/D converter for converting the received signal to digital form, and a sorter for separating the converted signal into I and Q components which are applied to a square root raised cosine (SQRC) filter 29 that is matched to the transmitter pulse shaper 22. Output signals of the matched filter 29 are fed to a baseband data demodulator 30. Demodulator 30 processes the I and Q received signals to extract the speech information that is input to the vocoder 16. Another important task of demodulator 30 is to process incoming received signals to achieve and maintain frame/slot synchronization. This function is preferably accomplished in accordance with the method and apparatus described in commonly assigned U.S. patent application Ser. No. 07/754,108, filed Sep. 3, 1991 by S. Chennakeshu and R. Toy, entitled "Frame/Slot Synchronization for U.S. Digital Cellular Radio Telephone System". Frame/slot synchronization information is also provided to the frame/burst formatter 18 for use in synchronizing the transmitted information with the frame/slot timing.

Figure 3:
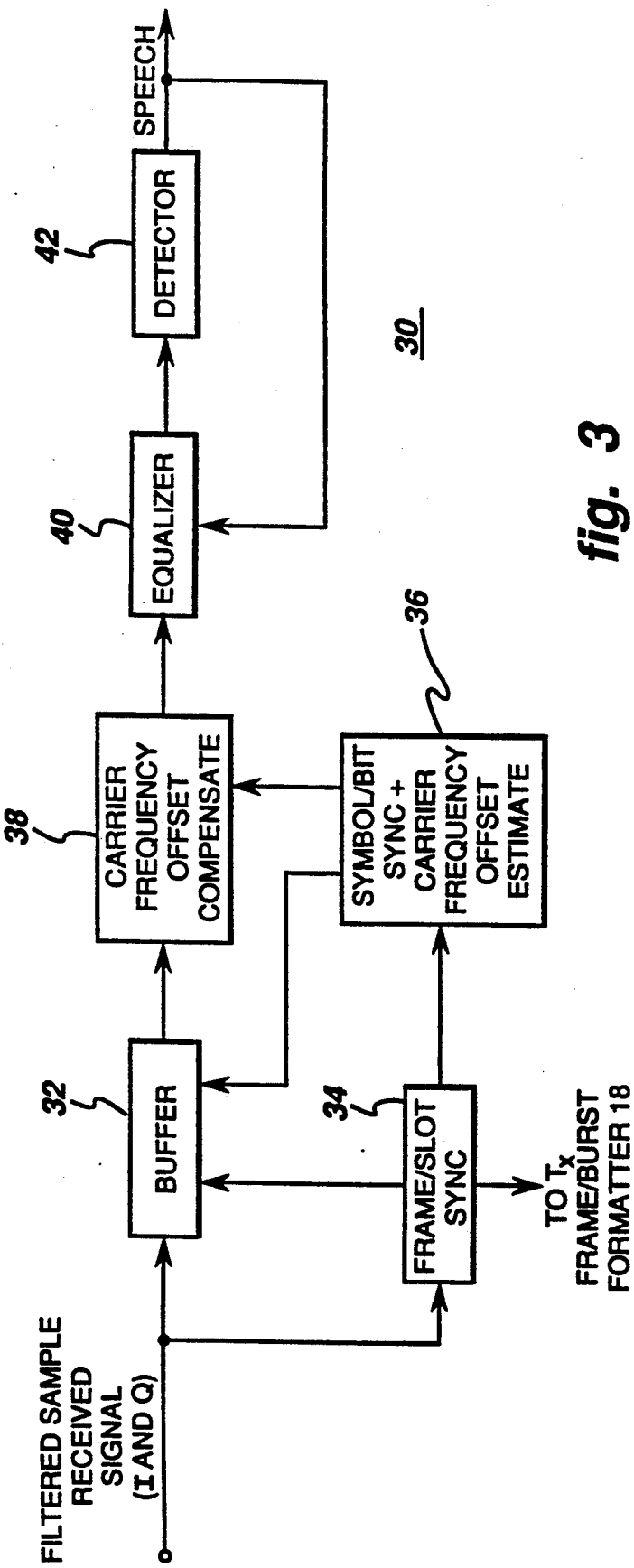
FIG. 3 is a block diagram that illustrates in greater detail the demodulator of FIG. 1.

As shown in greater detail in FIG. 3, demodulator 30 includes an input buffer 32 and a frame/slot synchronizer 34, each of which receives the I and Q digital data provided by square root raised cosine filter 29 following the A/D converters and sorter 28. Filter 29 may be eliminated to reduce circuit complexity at the expense of some performance degradation. It is also possible to approximate the square root raised cosine filter characteristic through an appropriately designed IF filter in order to minimize performance degradation. Further components of demodulator 30 process the input data to perform carrier frequency error compensation (block 38), symbol timing adjustment (block 36), equalization (block 40) and detection (block 42).

System 10 of FIG. 2 may be implemented in any one of a number of suitable embodiments including discrete components, digital signal processors and combinations thereof. In a presently preferred embodiment of the invention, vocoder 16 and the digital modulator, including formatter 18, encoder 20 and pulse shaper 22, are each implemented with a digital signal processor of the type known as TMS320C25, while demodulator 30 is implemented with a digital signal processor of the type known as TMS320C30. The TMS320-type digital signal processors, including application and programming information, are available from Texas Instruments, Incorporated. The invention, however, is not to be construed as being limited to any one specific hardware or software embodiment.

Before describing in greater detail equalizer 40 of FIG. 3, used in conjunction with the adaptive MLSE/VA demodulator 30 embodiment, an embodiment of a maximum likelihood sequence estimator for processing data transmitted over an additive white Gaussian noise (AWGN) channel having ISI is first described. A sampled signal received over such a channel may be represented as:

$$r(j) = \sum_{k=-N}^{N} I(j-k)f(k) + \gamma(j) j \epsilon N_s \quad (1)$$

where, $\{I(n)\}$ represent the transmitted data symbols, $N_s$ denotes a number of symbols in the transmitted slot and $f(k) = g(k) * h(k)$, where $\{g(k), -N_g \leq k < N_g\}$ denote samples of the transmit filter's impulse response having a duration $2N_g+1$ symbol intervals. $\{h(k)\}$ denote samples of the channel impulse response (CIR) which is assumed to be non-zero only for $(-N \leq k \leq N)$. $\{n(j)\}$ are white Gaussian noise samples.

For a received signal of the form given by equation (1) an optimum demodulator can be shown to comprise a matched filter followed by an MLSE, as indicated by Ungerboeck in the aforementioned article entitled "Adaptive Maximum Likelihood Receiver for Carrier Modulated Data Transmission Systems", IEEE Trans. Comm., Vol. COM-22, No. 5, pp. 624–636, May 1974. The MLSE must observe the sequence $\{r(n)\}$. Ungerboeck shows that the optimal estimate of the sequence $\{I(n)\}$ is the estimate that assigns the maximum value to the metric:

$$J_n(I(n)) = J_{n-1}(I(n-1)) + \quad (2)$$

$$Re\left[\tilde{I}^*(n)\left(2x(n) - s(0)\tilde{I}(n) - 2\sum_{m \leq n-1} \tilde{I}(m)s(n-m)\right)\right];$$

where $$x(n) = \sum_{k=-N_s-N}^{N_s+N} f^*(k)r(n+k)$$

where $\{\tilde{f}(n)\}$ corresponds to an estimate of $\{f(n)\}$, and where $$s(l) = s^*(-l) = \sum_{k=-N}^{N} \tilde{h}(k)\tilde{h}^*(k+l) \quad (3)$$

The s(1) terms are referred to as signal elements and are obtained from an autocorrelation of the CIR {h(n)}. Since the CIR is of finite duration, s(1) equals zero for $|1| > N$. Using this condition in the metric expressed in Equation (2) the following metric results:

$$J_n(\tilde{I}(n)) = J_{n-1}(\tilde{I}(n-1)) + \quad (4)$$

$$Re\left[ \tilde{I}^*(n)\left( 2z(n) - s(0)\tilde{I}(n) - 2\sum_{m=1}^{N} I(n-m)\tilde{s}(m) \right) \right].$$

It should be noted that this metric can be arrived at through alternative approaches.

For a pi/4-Shifted-DQPSK modulated signal a maximum likelihood estimation of a sequence of length L would require computation of $4^L$ metrics, as defined by Equation (2), corresponding to the $4^L$ possible sequences. The Viterbi algorithm, as indicated by both Forney and Ungerboeck in the above mentioned articles, provides an efficient procedure for finding the best sequence from among the $4^L$ possible sequences.

Figure 4:
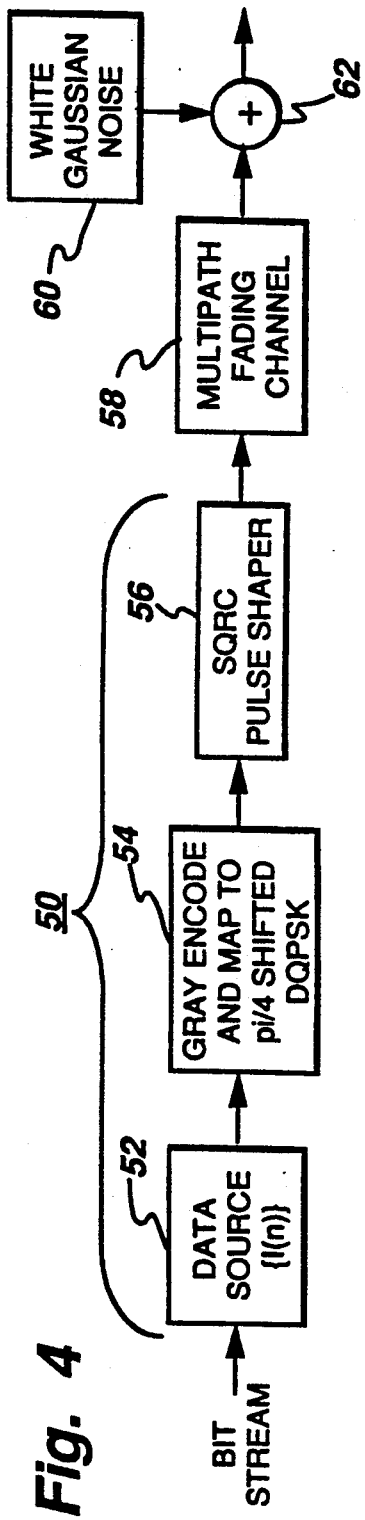
FIG. 4 is a block diagram of the transmission components of the digital cellular radio signal.

As indicated above, the optimum demodulator for a signal corrupted by AWGN and ISI comprises a matched filter followed by a maximum likelihood sequence estimator, while a block diagram of a baseband transmitter 50 and channel for generating such signals is shown in FIG. 4. As shown in FIG. 4, pairs of input data bits are formed into a sequence {I(n)} by data source 52, which are Gray encoded and applied to pi/4-shifted-DQPSK modulator 54. The modulated signal is applied to an SQRC pulse shaper 56. The modulator 54 and pulse shaper 56 correspond to the blocks 20 and 22, respectively, of FIG. 2. An effect of multipath fading is applied to the signal by block 58. The signal also has added thereto, at a summing junction 62, a white Gaussian noise component 60. It is the output signal of summing junction 62 that is received and which must be accurately demodulated to extract the intelligence therefrom.

In the demodulator, the matched filter is required to be adaptive because it must be matched to the convolution of the impulse response of transmit filter 56 and the time varying channel impulse response (CIR) introduced by block 58. For example, for a square root raised cosine filter, which can be approximated by a 10 tap filter, with taps at symbol spacings and a channel introducing one symbol of interference, the matched filter of the demodulator requires a length of at least 11 taps. In a practical implementation the matched filter would require a significantly larger number of taps. However, adaptation of a large number of taps is computationally expensive and may be unacceptable for achieving satisfactory real-time performance. To keep computational complexity low it is desirable to adapt only from two to four taps.

Figure 5:
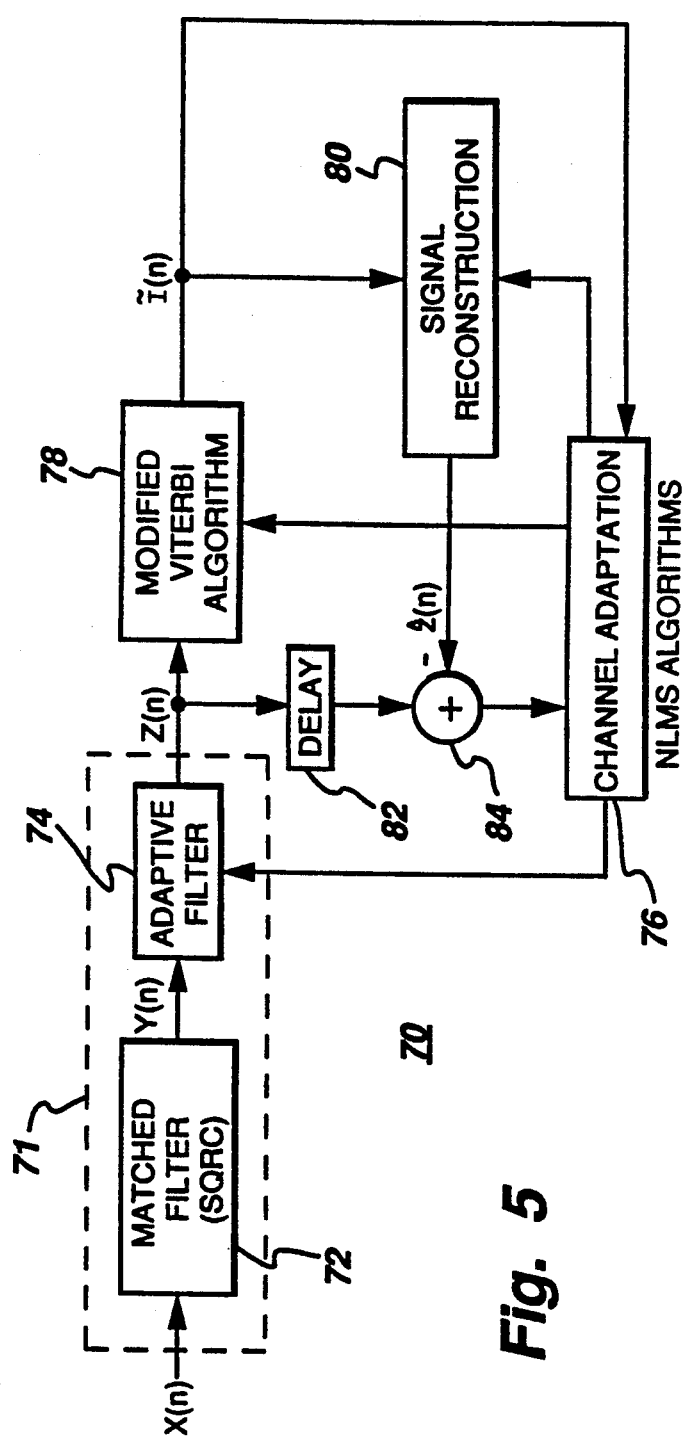
FIG. 5 is a block diagram of the adaptive MLSE-VA demodulator of the invention.

FIG. 5 illustrates, in accordance with an embodiment of the invention, an MLSE-VA demodulator 70 that is especially adapted for demodulating the AWGN and ISI corrupted received signal. The complexity of the matched filter 71 is minimized by partitioning, or splitting, the matched filter into two sections. The first section is comprised of a fixed transversal filter 72 that is matched to the SQRC transmit pulse shaper 56. The fixed transversal filter can be approximated by a suitably designed IF filter. The second section is comprised of an adaptive filter 74 that is matched to the channel characteristics. For a two ray channel model this presently preferred configuration requires adaptation of only two to four taps that are symbol spaced or fractionally spaced apart.

At the beginning of each of the time slots 2 of frame 1 of FIG. 1, adaptive filter 74 is initialized with an estimate of the CIR. This estimate is preferably obtained from a complex fast Kalman algorithm (CFKA) that operates over the 13 symbol preamble 3 (FIG. 1). Operation of the CFKA is described in the above mentioned commonly assigned U.S. Patent Application Ser. No. 07/754,105, filed Sep. 3, 1991, entitled "Decision Feedback Equalization for Digital Cellular Radio" and is also described below.

For a relatively short preamble a recursive least squares (RLS) algorithm, such as the CFKA, must be employed to obtain a satisfactory initial estimate of the CIR. This algorithm has a complexity on the order of $N_t$ complex additions and multiplications, where $N_t$ represents the number of taps in adaptive filter 74.

Figure 6:
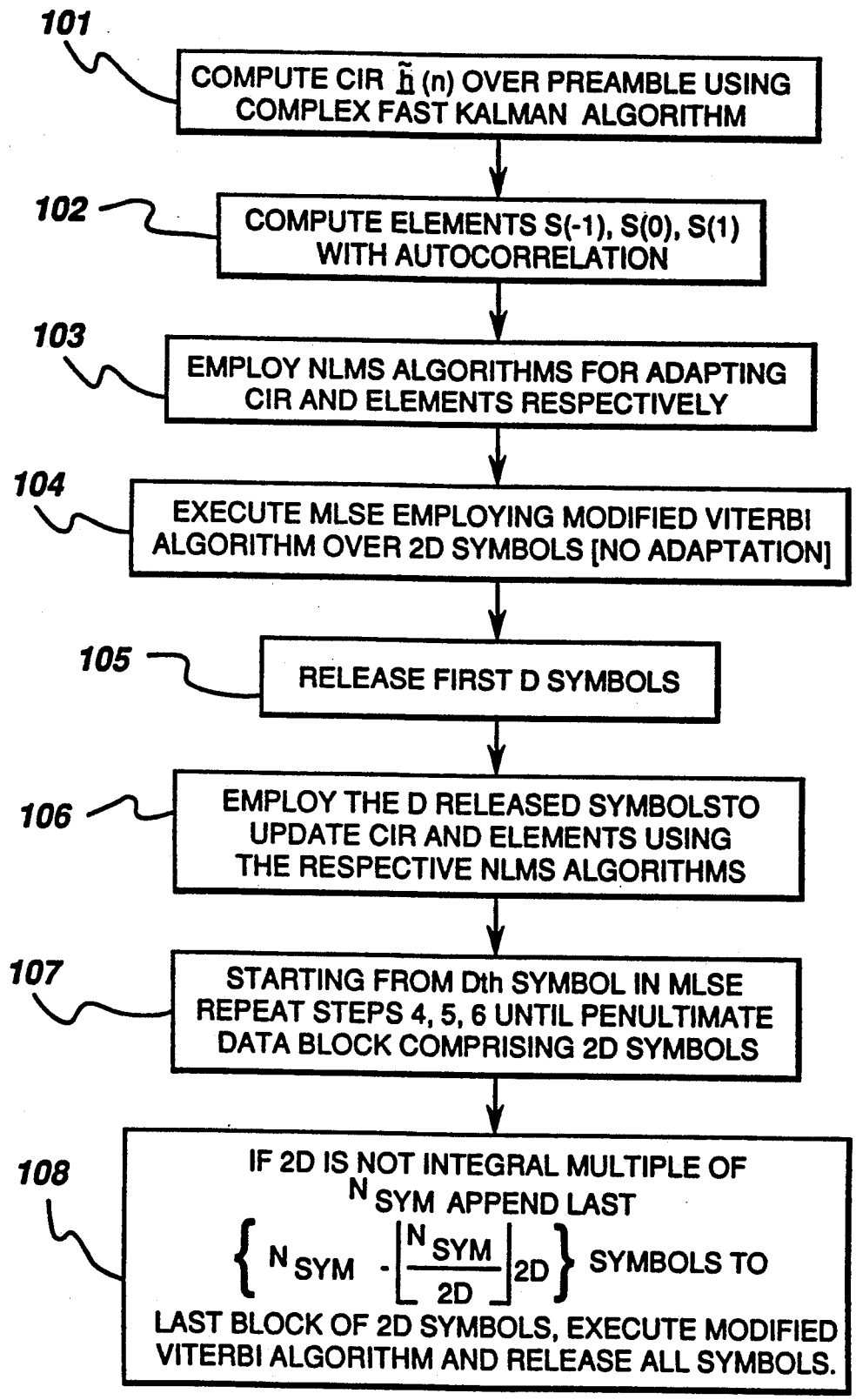
FIG. 6 is a flow chart illustrating the operation of a normalized least mean squared (NLMS) algorithm of the invention.

Following the preamble and during the frame 1 data slot 4 (FIG. 1) the filter coefficients are adapted using an output signal from a channel adaptation circuit 76 that operates in accordance with a normalized least mean square error (NLMS) algorithm, the flow chart for which is shown in FIG. 6. Although the NLMS technique exhibits slower convergence than the CFKA, it has an adequate tracking performance with a significant reduction in complexity over the CFKA technique. The NLMS tracking algorithm, when adopted, operates on complex data as follows:

$$e(n) = z(n) - [s(0)\tilde{I}(n) + s(1)\tilde{I}(n-1) + s^*(-1)\tilde{I}(n+1)] \quad (i)$$

$$r(n) = r(n-1) + [|y(n)|^2 - |y(n-N)|^2] \quad (ii)$$

$$(iii) \quad \tilde{h}(n) = \tilde{h}(n-1) + \frac{e^*(n)}{r(n)} Y(n)$$

where Y(n) denotes the vector [y(n) y(n−1) ... y(n−N+1)] and h (n) denotes the vector $(\tilde{h}_n(1)\tilde{h}_n(2) \ldots \tilde{h}_n(N))$ representing the computed estimates of the CIR, as per the first step 101 in the flow chart of FIG. 6.

Another method for obtaining an estimate of the channel CIR involves a correlation-based search using the preamble, as described in the aforementioned articles by R. D'Avella et al. "An Adaptive MLSE Receiver for TDMA Digital Mobile Radio", IEEE Journal on Selected Areas in Communications, Vol. 7, No. 1, pp. 122-129, January 1989, G. D'Aria et al. "Design and Performance of Synchronization Techniques and Viterbi Adaptive Equalizers for Narrowband TDMA Mobile Radio", proceedings of 3rd Nordic Seminar on Digital Land Mobile Radio Comm., Copenhagen, Denmark, Sep. 13-15, 1988 and by A. Baier et al., "Bit Synchronization and Timing Sensitivity in Adaptive Viterbi Equalizers for Narrowband TDMA Digital Mobile Radio Systems", proceedings of IEEE Vehicular Technology Conference, Philadelphia, pp. 372-382, 1988. This alternative method is comparable to use of the RLS algorithm only if the preamble sequence has certain desirable correlation properties.

The MLSE demodulator 70 is implemented using a modified Viterbi algorithm 78, which is described by G. Ungerboeck in "Adaptive Maximum Likelihood Receiver for Carrier Modulated Data Transmission Systems", IEEE Trans. Comm., Vol. Com. 22, No. 5, pp. 624–636, May 1974. The modified Viterbi Algorithm follows the same procedure as the Viterbi Algorithm for Maximum Likelihood Sequence Estimation, the latter being described by G. D. Forney in "Maximum Likelihood Sequence Estimation of Digital Sequences in the Presence of Intersymbol Interference", IEEE Trans. Info. Theory, Vol. IT 18, pp. 363–378, May 1972, with the exception that the conventional squared metric employed in the Viterbi algorithm is replaced by the metric defined in equation (4).

In order to compute equation (4) it is necessary to determine the signal elements $\{S(1)\}$, as indicated at step 102 of FIG. 6. The signal elements can be formed as the autocorrelation of the estimated CIR as given by equation (3). However, this method generates poor estimates of the signal elements due to misadjustment error in the estimated CIR, resulting from use of the NLMS algorithm. Therefore, the signal elements are directly estimated using an NLMS algorithm that exploits the symmetry property described by equation (3). With $N=1$, this preferred NLMS algorithm operates in accordance with step 103 of the flowchart of FIG. 6.

Figure 7:
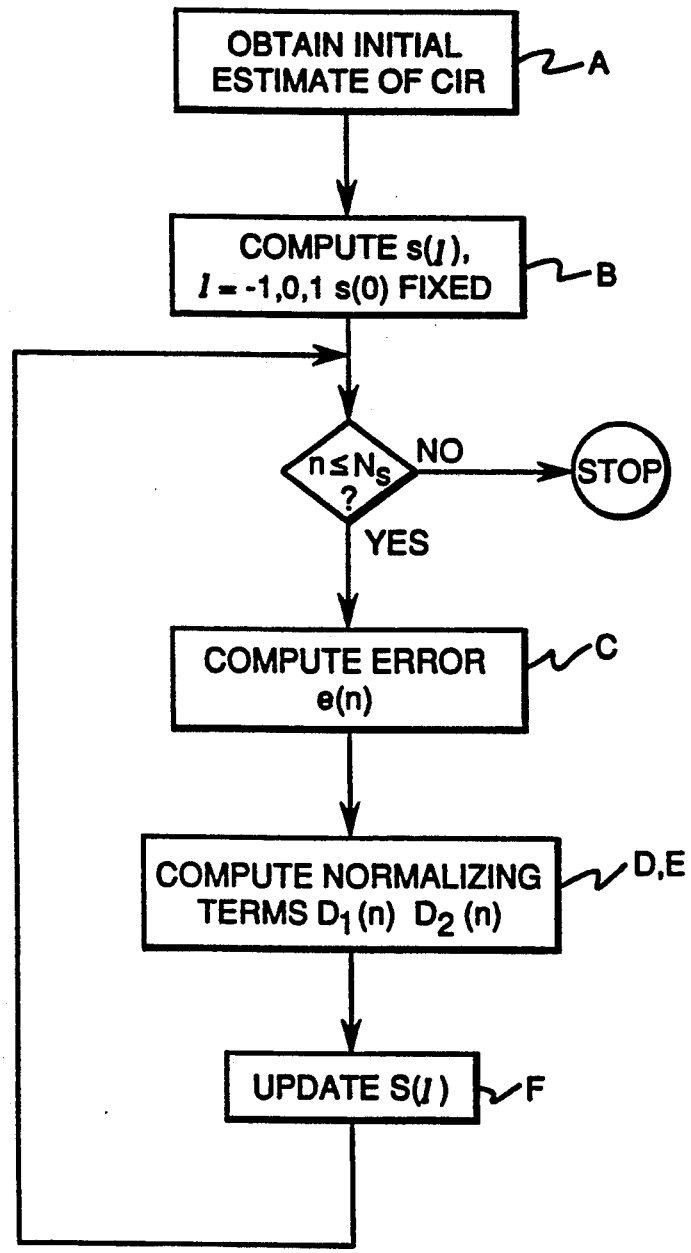
FIG. 7 is flow chart illustrating a method of the invention.

FIG. 7 is a flowchart illustrating a method of operation of the invention. At step A, an initial estimate ($h(n)$) of the CIR is obtained through the CFKA. At step B $s(1)$, $1 = -1,0,1$ is computed from Equation (4). Next, at step C and for $n \leq N_s$, the error is computed in accordance with Equation (5) as follows:

$$e(n) = z(n) - [s(0)\widetilde{I}(n) + s(1)\widetilde{I}(n-1) + s^*(1)\widetilde{I}(n+1)] \quad (5)$$

Subsequent steps D and E involve computing the following:

$$D_1(n) = 3|I(n+1)|^2 + |\widetilde{I}(n-1)|^2, \text{ and} \quad (6)$$

$$D_2(n) = 3|I(n-1)|^2 + |\widetilde{I}(n+1)|^2, \quad (7)$$

where $D_1(n)$ and $D_2(n)$ are normalizing terms. Finally, at step F, $S_n(1)$ is updated as:

$$s_n(1) = s_{n-1}(1) + \frac{e^*(n)}{D_1(n)} I(n+1) + \frac{e(n)}{D_2(n)} I^*(n-1) \quad (8)$$

In this scheme $s(0)$ is kept fixed at a value corresponding to the power in the CIR components that have been estimated using the CFKA over the preamble sequence, and is not updated. It may be noted that $D_1(n)$ and $D_2(n)$ are constants equal to 4 for p1/4-shifted-DQPSK and need not be computed repeatedly in the algorithm.

Equations (5), (6) and (7) present one method of forming the elements $\{s(1)\}$. Another method is to compute the elements $\}s(1)\}$ directly from the estimated CIR using equation (3). However, this requires smoothing the estimated CIR, represented by the vector for $h(n)$. Computation of the elements using this algorithm is as follows:

Step 1
Compute $\widetilde{h}(n) = [\widetilde{h}_n(1)\widetilde{h}_n(2) \ldots \widetilde{h}_n(N)]$ as before.
Step 2

$$\sigma(n) = \gamma\sigma(n-1) + 1$$

with an initial value of $\sigma(0) = 0$ and $\gamma$ chosen to be a value between 0.9–0.95.
Step 3

$$\widetilde{h}_s(n) = \widetilde{h}_s(n-1) + \frac{1}{\sigma(n)} [\widetilde{h}(n) - \widetilde{h}_s(n)]$$

where $h_S(n)$ is the vector of smoothed CIR coefficients denoted by $[h_{sn}(1)\ h_{sn}(2) \ldots h_{sn}(N)]$. The subscript sn denotes a smoothed estimate at time n.

$$s(1) = s^*(-1) = \sum_{k=1}^{N} h_{sn}(k)\ h_{sn}^*(k+1)$$

In the equalizer considered herein $1 = -1,0,1$. This value of $s(0)$ is kept fixed and is not updated at each time instant. The value of $s(0)$ is set equal to the power in the CIR components that have been estimated using the CFKA over the preamble sequence. $s(0)$ is kept fixed at this value and is not updated at each time instant. $s(1)$ and $s(-1)$ are updated with time as indicated in Step 4 of the above algorithm. For instance, at the $n^{th}$ instant, $s(1)$ and $s(-1)$ are computed as follows:

$$s(1) = \widetilde{h}_{sn}(1)\widetilde{h}_{sn}^* \quad (2)$$

$$s(-1) = s^*(1)$$

A further consideration in operating MLSE-VA demodulator 70 (FIG. 5) is the selection of an appropriate decision depth (D) for the Viterbi algorithm. The decision depth is a function of the rate of adaptation required and also of the fading characteristics of the channel. As such, the particular value of D may best be individually determined for each particular application. It is noted that the SQRC matched filter 72 and the MLSE introduce a total delay of D+N symbols. Thus, an implementation of the adaptation algorithm must account for this delay by the inclusion of a delay 82 at the input to summing junction 84 of MSLE-VA demodulator 70. The signal reconstruction circuit 80 reconstructs the signal by convolving the estimated symbols $\{\widetilde{I}(n)\}$ with the signal elements as follows:

$$\text{reconstructed signal } z(n) = \sum_{k=-N}^{N} s(k)\widetilde{I}(n-k) \quad (9)$$

and applies the reconstructed signal to the summing junction 84. The adaptive filter 74 operates to adjust the channel impulse response estimate and the signal elements in a manner to minimize the mean squared error between $Z(n)$ and $z(n)$.

A block update adaptation technique is employed in the MLSE-VA demodulator implementation. In this technique the modified Viterbi algorithm is applied on the first 2D stages and symbols corresponding to the first D stages are released (step 105 of FIG. 6). These D symbols are employed to adapt the adaptive filter coefficients (channel estimate) and the signal elements. Next, the modified Viterbi algorithm is restarted and applied once more for 2D stages beginning at the Dth stage and, once again, the first D symbols are released for adaptation of the adaptive filter coefficients (channel estimate) and signal elements (step 106 of FIG. 6). This procedure of releasing D symbols, updating and running the modified Viterbi algorithm on blocks of length 2D is continued until the end of the received slot (step 107 of FIG. 6). If 2D is not an integral multiple of the number of symbols in the slot $(N_{sym})$, $\{N_{sym}\}-(-N_{sym}2D\ 2D\}$ symbols are appended to the last block of 2D sy and the modified Viterbi algorithm is applied to the augmented last block (step 108 of FIG. 6). For this last block, all symbols are released upon reaching the last stage. This technique implies that the last few symbol decisions may be unreliable. However, when transmitting speech the least important bits in every speech frame may be placed at the end of the slot to mitigate the effect of the unreliable decisions.

In the modified Viterbi algorithm described above, there is a delay of D symbol periods, due to the decision depth, associated with the CIR and element updates. This results in the updated CIR and elements lagging the true CIR and corresponding element values, causing performance degradation especially at high vehicle speeds. This effect may be minimized by using a fixed extrapolator to predict the current CIR (at time n) using the estimated CIR (at time n−D) as described in an article entitled "New Adaptive Viterbi Detector for Fast-Fading Mobile Radio-Channels", by E. Dahlman, Electronics Letters, 13 September 1990, Vol. 26, No. 19, pages 1572-1573. The latter article describes the use of a simple fixed extrapolator in conjunction with a recursive least squares CIR estimation algorithm. This technique is readily adaptable for NLMS CIR estimation and NLMS element estimation algorithms. The algorithm for enhancing CIR estimates is as follows:

$$\tilde{h}_n(j) = \tilde{h}_{n-D}(j) + \delta[\tilde{h}_{n-D}(j) - \tilde{h}_{n-D-\epsilon}(j)] \quad (10)$$

where D is the decision depth delay, $\delta$ is the gain term of the extrapolator and $\epsilon$ is the step size of the extrapolator and is related to $\delta$ as follows, $\epsilon = D/\epsilon$. For a given $\epsilon$, although $\delta$ is chosen based on a suitable decision depth D, the gain term $\delta$ must also be selected to minimize the increase in random noise in the CIR estimates, which is shown to be $1+2\delta+2\delta^2$ in the aforementioned Dahlman article. As an example, if D=10 and $\epsilon$=10 then a value of $\epsilon$=0.8-1 is a reasonable choice.

A similar technique can be adopted to estimate the element s(1) at time n from an estimate at time n−D.

The Complex Fast Kalman algorithm is described below, preceded by the following definitions set forth as an aid in understanding its operation. Specifically:

i) $F_{Np}(b)$: N×p matrix of forward predictor coefficients with $F_{Np}(0)=0_{Np}$;

ii) $B_{Np}(n)$: N×p matrix of backward predictor coefficients with $B_{Np}(0)=0_{Np}$;

iii) $E_{pp}(n)$: p×p matrix with $E_{pp}(0)=\delta^{-1}I_{pp}$ where $I_{pp}$ is an identity matrix and $\delta$ is chosen to be a small positive number, and where $\delta$ is found to be an estimate of the final mean square error;

iv) $K_N(n)$: N-dimensional Kalman gain vector with $K_N(0)=K_N(1)=0$; p1 v) $K^e_M(n)$: M=N+p extended Kalman gain vector;

vi) $\epsilon_p(n|n-1)$, $\epsilon_p(n|n)$ p-dimensional forward prediction error vectors;

vii) $V_p(n|n-1)$: p-dimensional backward prediction error vector;

viii) $\mu_p(n)$: p-dimensional vector obtained by partitioning $K^e_M(n)$;

ix) $M_N(n)$: N-dimensional vector obtained by partitioning $K^e_M(n)$;

x) $C_N(n)$: N-dimensional vector of equalizer coefficients; and xi) $\lambda$: a "forgetting" parameter chosen to be typically between 0.9-1.0.

For a transversal filter equalizer, p is set to 1; for a symbol rate DFE, p is set to 2; and for a fractionally spaced DFE, p is set to 3. Data Vectors are described below in accordance with the following.

i) y(n) corresponds to received data samples.

ii) s(n)=I(n), where I(n) denotes preamble 3 data samples corresponding to a training mode; and s(n)=d(n), where d(n) denotes detected data samples corresponding to a tracking mode.

iii) $X_N(n)=[y(n-1) \ldots y(n-N_1)|s(n-2) \ldots s(n-N_2-1)]^T$; where T denotes transpose and $N=N_1+N_2$. $N_1$ represents a number of feed-forward taps, while $N_2$ represents a number of feedback taps.

iv) $\eta_p(n)=[y(n)|s(n)]^T$.

v) $\rho_p(n)=[y(n-N_1)|s(n-N_2-1)]^T$.

In accordance with the foregoing definitions the Complex Fast Kalman Algorithm operates as described below. Starting at n=1 the computations are carried out in the following order:

$$\epsilon_p(n|n-1) = \eta_p(n) - F^H_{Np}(n-1)X_N(n) \quad (11)$$

$$F_{Np}(n) = F_{Np}(n-1) + K_N(n)\epsilon^H_p(n|n-1) \quad (12)$$

$$\epsilon_p(n|n) = \eta_p(n) - F^H_{Np}(n)X_N(n) \quad (13)$$

$$E_{pp}(n) = G_{pp}(n-1) - \frac{G_{pp}(n-1)\epsilon_p(n|n)\epsilon_p^H(n|n-1)G_{pp}(n-1)}{1 + \epsilon_p^H(n|n-1)G_{pp}(n-1)\epsilon_p(n|n)} \quad (14)$$

where $G_{pp}(n-1) = \frac{1}{\lambda} \cdot E_{pp}(n-1)$ $$K^e_M(n) = \left[\frac{E_{pp}(n)\epsilon_p(n|n)}{K_N(n) - F_{Np}(n)E_{pp}(n)\epsilon_p(n|n)}\right] \quad (15)$$

$$K^e_M(n) = \left[\frac{M_N(n)}{\mu_p(n)}\right] \quad (16)$$

$$V_p(n|n-1) = \rho_p - (n) - B^H_{Np}(n-1)X_N(n+1) \quad (17)$$

$$B_{Np}(n) = [B_{Np}(n-1) + M_N(n)v^H(n|n-1)]D_{pp}(n) \quad (18)$$

$$D_{pp}(n) = I_{pp} - \frac{\mu_p(n)v_p^H(n|n-1)}{1 + V_p^H(n|n-1)\mu_p(n)}$$

where $I_{pp}$ is a p×p identity matrix.

$$K_N(n+1) = M_N(n) + B_{Np}(n)\mu_p(n) \quad (19)$$

$$e(n) = I(n-1) - C^H_N(n-1)X_N(n) \quad (20)$$

where $X_N(n)$ is defined for the training mode and H denotes conjugate transpose, $$e(n) = d(n-1) - C^H_N(n-1)X_N(n) \quad (21)$$

where $X_N(n)$ is defined for the tracking mode, and $$C_N(n) = C_N(n-1) + K_N(n)e^*(n) \quad (22)$$

where * denotes conjugate.

The MLSE-VA demodulator 70 of FIG. 5 was operated over a simulated two ray mobile radio channel. A thirteen-symbol preamble 3 (FIG. 1) was used to obtain an initial estimate of the CIR via the Complex Fast Kalman algorithm. During the remainder of time slot 2 (FIG. 1) the NLMS algorithm was used to track the CIR. The decision depth (D) of the sequence estimator was chosen to be ten symbols. The performance of MLSE-VA demodulator 70 of FIG. 5 was found to exhibit a small degradation in comparison to that of the previously mentioned DFE technique, assuming error free decision directed feedback. The degradation is on the order of 1 dB in signal-to-noise ratio (SNR) at a BER of 1%. However, when actual detected data is used in the decision directed mode of the DFE algorithms, the difference in BER performance between the DFE and MLSE-VA techniques of the invention is insignificant. The MLSE-VA demodulator 70 provided adequate performance (<3% BER) for vehicle speeds between 20 and 50 mph at a significantly lower complexity than other techniques. Furthermore, the MLSE-VA demodulator 70 may be implemented using finite precision arithmetic, which is an important feature when implementing the method with a digital signal processor.

While the invention has been particularly shown and described with respect to a preferred embodiment thereof, it will be understood by those skilled in the art that changes in form and details may be made therein without departing from the scope and spirit of the invention.

What is claimed is:

1. Apparatus for demodulating a time division multiple access (TDMA) signal having a plurality of symbols, said signal comprising at least a synchronizing portion and a data portion within a time slot, said apparatus comprising:
    means for receiving the signal over a channel;
    first filter means coupled to an output of the receiving means and comprising a fixed transversal filter having a characteristic selected for matching to a fixed signal pulse characteristic of the received signal for producing a filtered signal, said first filter means characteristic being selected for matching a square root raised cosine pulse characteristic of the received signal; and
    second filter means coupled to an output of the first filter means and comprising an adaptive filter having a characteristic selected for adaptively compensating the filtered signal for a time varying impulse response of the channel.

2. Apparatus as set forth in claim 1 and further comprising means responsive to the filtered signal for initially adapting the second filter means during a synchronizing portion of the filtered signal in accordance with a recursive least squares technique and for subsequently adapting the second filter means during the data portion of the filtered signal in accordance with a normalized least mean square technique.

3. Apparatus as set forth in claim 2 wherein the recursive least squares technique is implemented by a complex fast kalman algorithm.

4. Apparatus as set forth in claim 2 wherein signal elements represented by {s(l)} are determined initially through an autocorrelation of a channel impulse response, with signal element s(0) being fixed and signal elements s(l), l=1,2, ... N being adapted using the normalized least mean square technique.

5. Apparatus as set forth in claim 1 wherein the second filter means further includes means for processing the filtered signal in accordance with a Viterbi algorithm of decision depth D, the Viterbi algorithm being repetitively applied on blocks of 2D symbols, such that D symbols are released for adapting the second filter means and signal elements, during a data portion of the filtered signal, in accordance with a normalized least mean square (NLMS) technique.

6. A method for demodulating a time division multiple access (TDMA) signal having a plurality of symbols, said signal comprising at least a synchronizing portion and a data portion within a time slot, comprising the steps of:
    receiving the signal over a channel;
    filtering the received signal with fixed transversal filter means having a characteristic selected for matching to a fixed signal pulse characteristic of the received signal, the step of filtering the received signal including matching a filter to a square root raised cosine pulse characteristic of the received signal; and
    adaptively filtering the filtered signal with adaptive filter means in order to compensate for a time varying impulse response of the channel.

7. The method as set forth in claim 6 and further comprising the step of:
    adapting the adaptive filter means during the data portion of the filtered signal in accordance with a normalized least mean square (NLMS) algorithm.

8. The method as set forth in claim 6 wherein the step of adaptively filtering the filtered signal includes repetitively applying a Viterbi algorithm of decision depth D to blocks of 2D symbols such that, during the data portion of the filtered signal, D symbols are released for adapting the adaptive filter means and signal elements, in accordance with a normalized least mean square (NLMS) algorithm.

9. A method for demodulating a time division multiple access (TDMA) RF signal having a plurality of symbols, comprising at least a synchronizing portion and a data portion of a time slot, said method comprising the steps of:
    receiving the RF signal over a channel;
    filtering the received signal with fixed transversal filter means having a characteristic selected for matching a square root raised cosine pulse characteristic of the received RF signal; and
    adaptively filtering the filtered signal with adaptive filter means in order to compensate for a time varying impulse response of the channel, the step of adaptively filtering including the steps of,
    initially adapting the adaptive filter means during the synchronizing portion of the filtered signal in accordance with a recursive least squares algorithm; and
    subsequently adapting the adaptive filter means during the data portion of the filtered signal in accordance with a normalized least mean square (NLMS) algorithm.

10. The method set forth in claim 9 wherein the step of subsequently adapting the adaptive filter means includes repetitively applying a Viterbi algorithm of decision depth D to blocks of 2D symbols, such that D symbols are released for adapting the adaptive filter means to the data portion of the filtered signal in accordance with the NLMS algorithm.

11. The method set forth in claim 10 wherein, when 2D is not an integral multiple of the number of symbols in the slot ($N_{sym}$), the last $\{N_{sym} - (N_{sym}/2D) 2D\}$ symbols are appended to a last block of symbols before the Viterbi algorithm is applied to the last block.

12. A method for demodulating a time division multiple access (TDMA) RF signal having a plurality of symbols and at least a synchronizing portion and a data portion of a time slot, comprising the steps of:
   (a) receiving the RF signal over a channel;
   (b) determining a channel impulse response of the received signal over the synchronizing portion;
   (c) determining signal elements s(−1), S(0), s(1) through autocorrelation, S being defined by $$s(1) = s^*(-1) = \sum_{k=-N}^{N} h(k)h^*(k+1);$$

where k represents the index of summation in said autocorrelation operation, N represents the number of samples of the channel impulse response, h(k) represents the estimate of the channel impulse response h(k), and * denotes conjugate;
   (d) employing a normalized least mean square algorithm for adapting the channel impulse response {h(n)};
   (e) operating a maximum likelihood sequence estimator over 2D symbols, said maximum likelihood sequence estimator being implemented by a modified Viterbi algorithm of decision depth D;
   (f) releasing D symbols;
   (g) employing the released D symbols to update the channel impulse response; and
   (h) beginning with a Dth symbol, repeating steps (e), (f) and (g) until a penultimate data block having 2D symbols is received, or, if 2D is not an integral multiple of a number of symbols $N_{sym}$, appending $\{N_{sym}-(N_{sym}/2D\ 2D\}$ symbols to a last block of 2D symbols.

13. In a digital cellular radio receiver having a maximum likelihood sequence estimator demodulator for receiving signal elements, represented by {s(1)}, and determining a value for said signal elements from an estimated channel impulse response, represented by $$h(n)=[h_n(1)h_n(2)\ldots h_n(N)],$$

wherein N denotes the number of samples of the channel impulse response, said demodulator including a channel adaption circuit, a matched filter including an adaptive filter matched to the channel impulse response, means coupling the channel adaption circuit to the adaptive filter, a modified Viterbi algorithm generator responsive to said adaptive filter, and a signal reconstruction circuit responsive to said channel adaptation circuit and said modified Viterbi algorithm generator, a method of determining a value for said signal elements comprising the steps of:
   (a) determining in said channel adaptation circuit a value of a first factor $\sigma(n)$ in accordance with $\sigma(n)=\gamma\sigma(n-1)+1$, with an initial value of $\sigma(0)=0$ and $\gamma$ chosen to be a value between 0.9–0.95;
   (b) determining in said channel adaptation circuit a vector of smoothed channel impulse response coefficients in accordance with the expression $$h_s(n) = h_s(n-1) + \frac{1}{\sigma(n)}[h(n) - h_s(n)],$$

where $h_s(n)$ is the vector of smoothed channel impulse response coefficients denoted by $[h_{sn}(1), h_{sn}(2)\ldots h_{sn}(N)]$, the subscript sn denoting a smoothed estimate at time n; nd
   (c) determining in said signal reconstruction circuit a value for the signal elements in accordance with the expression:

$$s(1) = s^*(-1) = \sum_{k=1}^{N} h_{sn}(k)\, h_{sn}^*(k+1).$$

14. The method set forth in claim 13 wherein a value of s(0) is kept fixed, and wherein s(1) and s(−1) are updated with time in accordance with the expression of step (c).

15. The method set forth in claim 14 wherein, for an $n^{th}$ instant, s(1) and s(−1) are computed in accordance with the expressions:

$$s(1)=h_{sn}(1)h_{sn}^*(2);\text{ and}$$

$$s(-1)=s^*(1).$$

* * * * *